May 1, 1956 M. DLUGATCH 2,743,601
HOOD LATCH LOCKING DEVICE FOR AUTOMOBILES
Filed Aug. 16, 1954 3 Sheets-Sheet 1
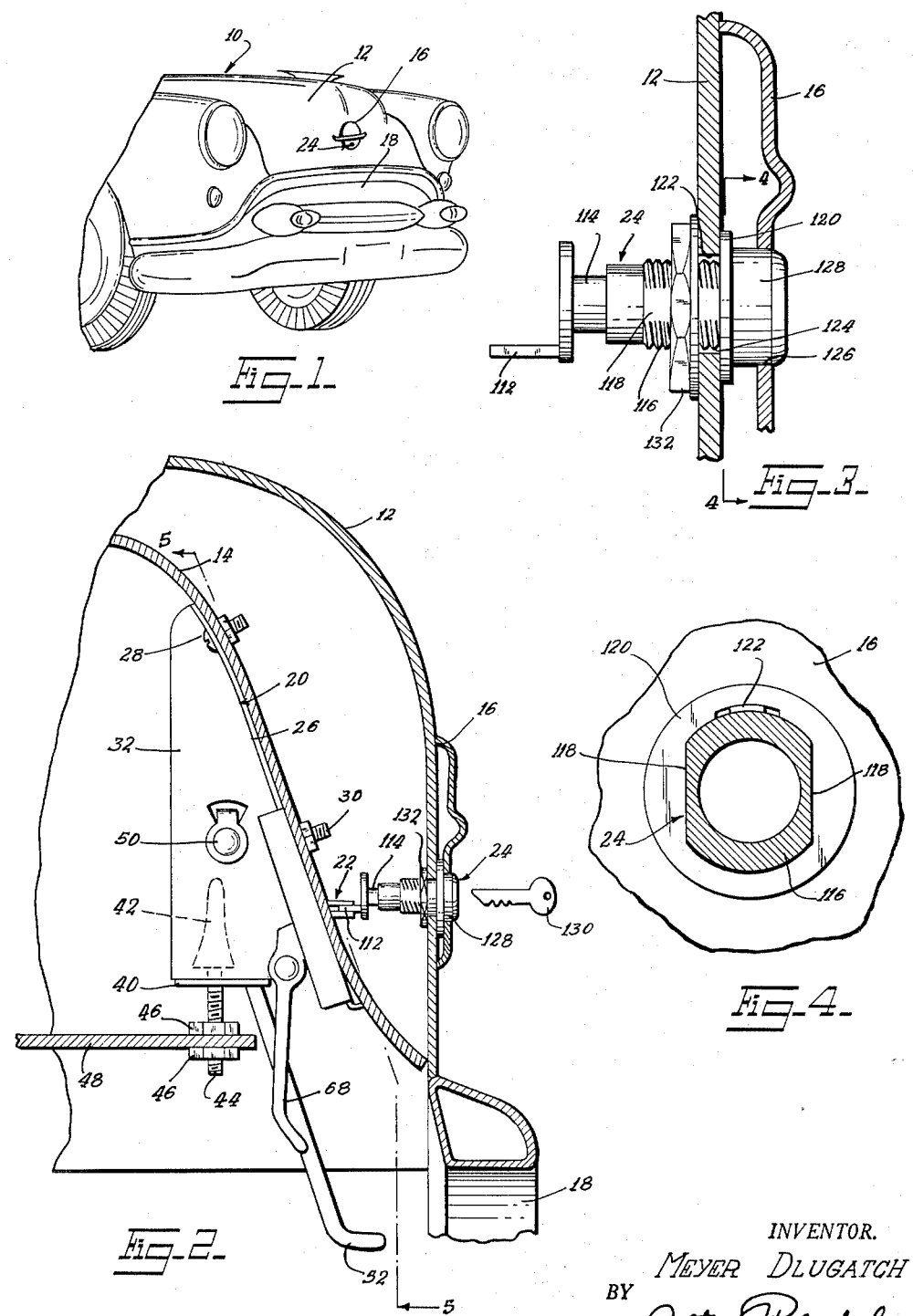
INVENTOR.
MEYER DLUGATCH
BY
ATTORNEY

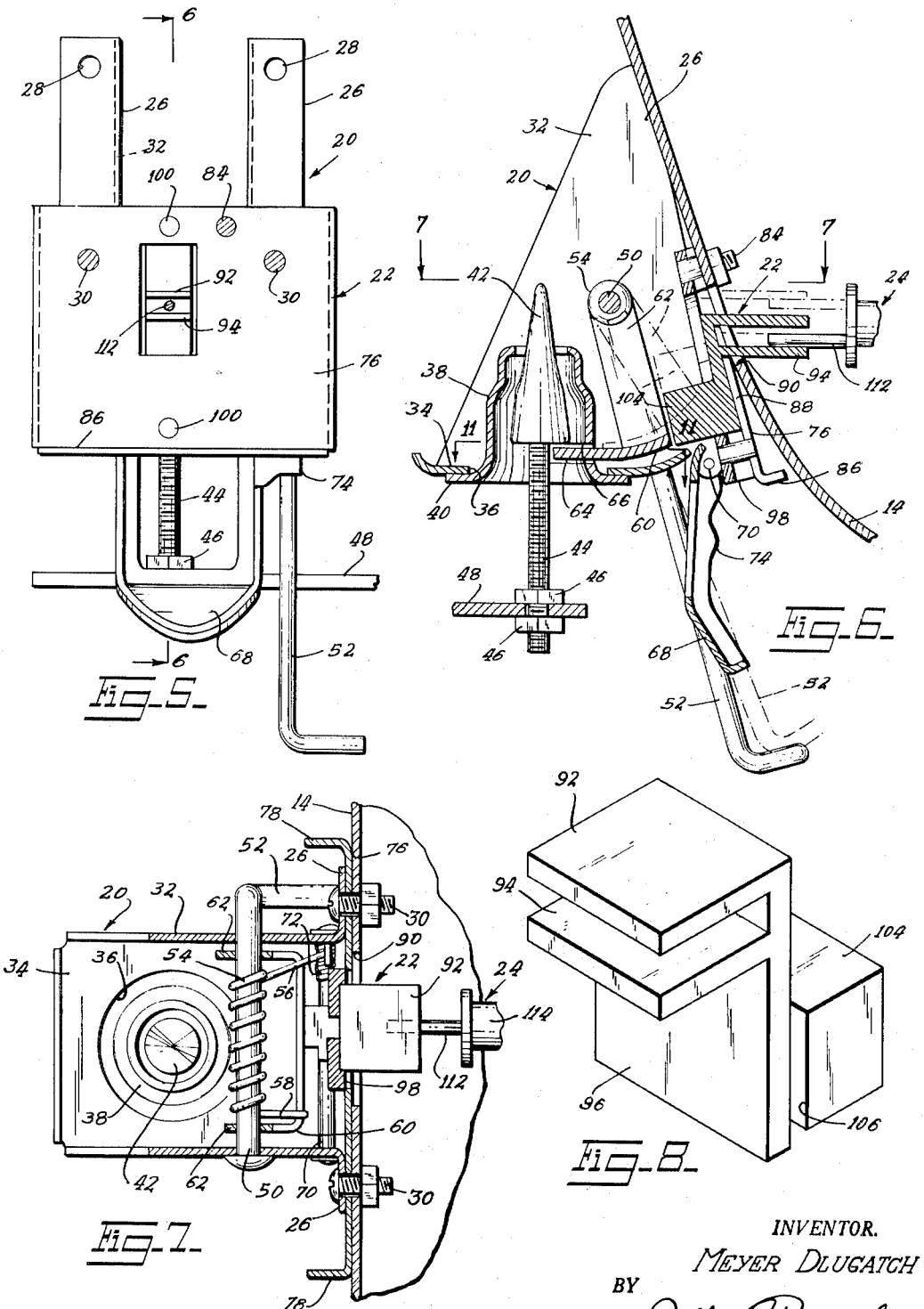

May 1, 1956 M. DLUGATCH 2,743,601
HOOD LATCH LOCKING DEVICE FOR AUTOMOBILES
Filed Aug. 16, 1954 3 Sheets-Sheet 3
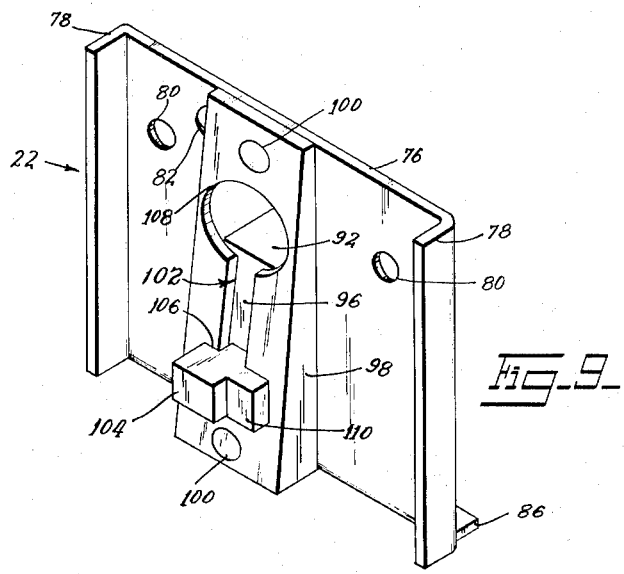
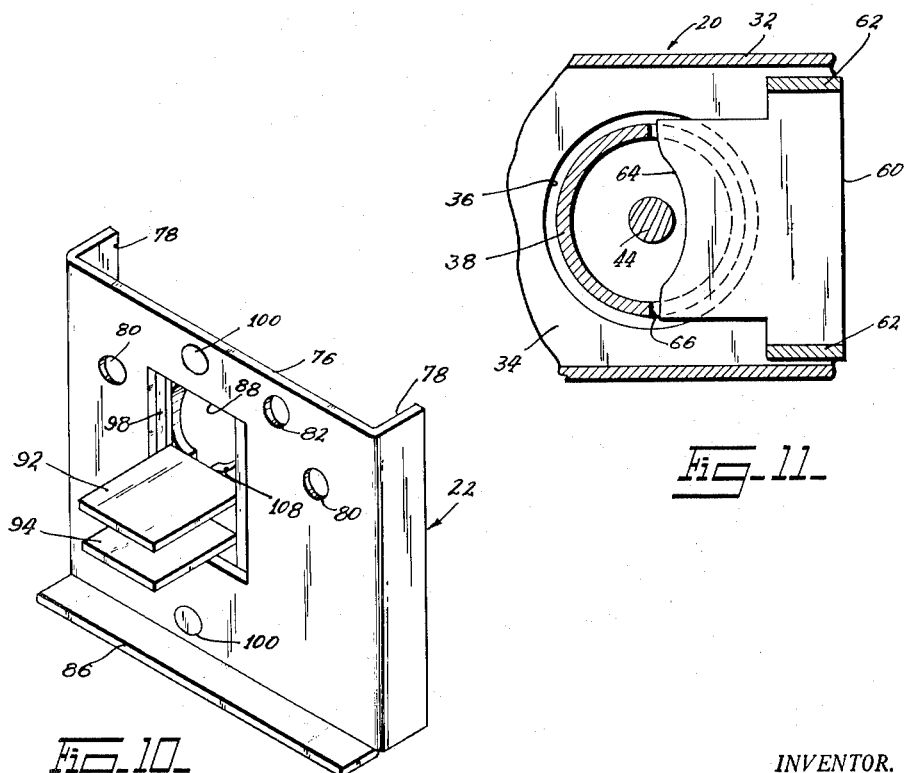
INVENTOR.
MEYER DLUGATCH
BY
ATTORNEY United States Patent Office 2,743,601
Patented May 1, 1956

2,743,601

HOOD LATCH LOCKING DEVICE FOR AUTOMOBILES

Meyer Dlugatch, New York, N. Y.

Application August 16, 1954, Serial No. 450,051

3 Claims. (Cl. 70—240)

This invention relates to a locking device for the hood latch of an automotive vehicle.

In view of the fact that many automobile hood latches are operated from without the automobile, the vehicles on which such hood latches are mounted are subject to being tampered with by unauthorized persons. It is, accordingly, the main object of the present invention to provide a locking device for an automobile hood latch, that will effectively prevent unauthorized opening of the hood.

Another object of importance is to provide, in a hood latch as described, a locking device that will be characterized by its ease of installation on conventionally designed vehicles.

Still another object is to so design the locking device as to facilitate its installation on hood latches already in use.

Yet another object of importance is to provide an automotive vehicle hood latch locking device which will be inconspicuous, being particularly adapted for mounting of the key-receiving part thereof in the conventional hood emblem of the vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary perspective view of an automotive vehicle equipped with a hood latch formed in accordance with the present invention.

Fig. 2 is an enlarged, fragmentary vertical sectional view through the latch and the associated locking device.

Fig. 3 is an enlarged, vertical sectional view showing the lock assembly.

Fig. 4 is a sectional view, still further enlarged, on line 4—4 of Fig. 3.

Fig. 5 is a sectional view on line 5—5 of Fig. 2.

Fig. 6 is a sectional view on line 6—6 of Fig. 5.

Fig. 7 is a sectional view on line 7—7 of Fig. 6.

Fig. 8 is an enlarged perspective view of the slide of the locking device.

Fig. 9 is a rear perspective view of the locking device per se.

Fig. 10 is a front perspective view of the locking device per se.

Fig. 11 is an enlarged sectional view on line 11—11 of Fig. 6.

Designated generally at 10 is an automobile hood comprising an outer or external plate 12, and an internal plate 14 spaced inwardly from the outer plate. A hood emblem 16 is mounted upon the outer plate 12, and below the hood emblem said outer plate terminates to provide a space 18 through which one inserts his hand when the hood is to be opened, the hood latch being disposed beyond said space upon the inner plate 14, and being designated generally at 20.

The locking device has been designated generally at 22 and is operable by a lock 24.

Hood latch 20, though being conventional per se, is described in detail herein in view of the fact that full illustration and description of the operation of the hood latch is necessary to an understanding of the structure and function of the locking device used in combination therewith. The hood latch, thus, includes transversely spaced, parallel flanges 26 attached by longitudinally spaced bolts 28, 30 to inner hood wall 14. The flanges 26 project outwardly in opposite directions from triangular side plates 32 spaced transversely of one another in vertical planes in back of the inner hood wall. Side plates 32, at their lower ends, are integral with the opposite sides of a horizontal bottom plate 34 extending therebetween. Bottom plate 34 is formed with a large opening 36.

An open-ended, generally tapered latch element housing 38 projects upwardly within opening 36 and is formed at its lower end with an outwardly directed flange 40 secured by spot welds or equivalent means to the underside of bottom plate 34. A latch element 42, in the latched or closed hood position, projects upwardly through housing 38. Latch element 42 is of tapered formation, and at its lower end is integral with a vertical, threaded shank 44 attached by lock nuts 46 to a structural member 48 of the vehicle, said structural member being a permanently stationary part of the vehicle.

A pivot shaft 50 is extended between side plates 32 and is journalled at its opposite ends in the side plates. At one end, shaft 50 is integral with a depending handle 52 adapted at its free end to be grasped by one extending his or her hand into opening 18. A spring 54 is circumposed about shaft 50 and has one end 56 anchored to an ear formed upon one side plate 32, the other end 58 of the spring bearing against the bight portion of a yoke 60 having upwardly extending legs 62 apertured for extension of shaft 50 therethrough, the shaft 50 being fixedly secured to said legs, thus to swing the yoke on rotation of the shaft.

A tongue 64 (Fig. 11) extends rearwardly from the bight of yoke 60, into a circumferentially extending slot 66 formed in the front part of housing 38. Tongue 64, in the closed hood position, engages under the lower end of the tapered element 42.

A hood lift handle 68 is pivoted at its upper end upon a pivot pin 70 extending between side plates 32, a spring 72 being circumposed about the pivot pin 70 to normally swing the lift handle 68 in a counterclockwise direction about its pivot. A lug 74 projects laterally from one side of hood lift handle 68, and is engaged by the latch operating handle 52 when the handle 52 is swung from the full to the dotted line position thereof shown in Fig. 6.

Disregarding for the moment the operation of the locking device constituting the present invention, it is pertinent to consider the operational characteristics of the illustrated hood latch.

Assuming that the hood is opened to latch the same in closed position it is necessary merely that one drop the hood. Tongue 64 is normally, both in the closed and opened positions of the hood, in the full line position thereof shown in Fig. 6. As a result, when the hood is dropped, the edge of tongue 64 will be engaged by the tapered surface of the upstanding latch element 42, and the tongue 64 will be temporarily swung to the right in Fig. 6, until the hood is fully closed. Then, the spring 54 will act to engage tongue 64 under the lower end of the latch element 42, thus to latch the hood in closed position.

To open the hood, one grasps handle 52, and pulls outwardly thereupon to shift the same to the dotted line position of Fig. 6. This causes tongue 64 to be shifted out from under the latch element 42. At the same time, hood lift handle 68 is swung to the right in Fig. 6 to a slight extent by handle 52, to dispose the hood lift handle 68 where it can be grasped readily by a user. The user can then swing the hood lift handle 68 in a counterclockwise direction in Fig. 6 to a desired extent, to facilitate lifting of the hood.

The locking device constituting the present invention is mounted between the hood latch 20 and the inner hood wall 14, being fixedly connected to the hood latch and inner wall by the bolts 30. The locking device 22 includes a rectangular main plate 76 having rearwardly extending side flanges 78. Openings 80 (Figs. 9 and 10) receive the bolts 30 to attach plate 76 to the hood wall.

A pilot opening 82 formed in plate 76 receives a bolt 84, whereby said plate 76 is connected to the hood wall in proper position, prior to attachment of the hood latch proper to said wall.

On the lower end of plate 76, a forwardly projecting lip 86 is provided to reinforce the plate construction.

Formed in plate 76 (Fig. 10) is a large rectangular opening 88, registering (Fig. 6) with a circular opening 90 formed in wall 14. A locking head 92 projects through opening 88, 90, and is of flattened, rectangular formation, with a slot 94 opening upon the front and sides of the head 92. Head 92 is formed upon the upper end of the flat body 96 sliding in back of the plate 76, the head 92 and body 96 constituting a slide mounted for slidable up-and-down movement upon a support plate 98 secured at its upper and lower ends by rivets 100 to the back of plate 76. A vertical slot 102 in support plate 98 receives a tongue defined by guide grooves 106 formed in the opposite sides of a locking projection 104 integrally provided at the lower end of the flat body 96.

The flat body 96 is slidably mounted between the plate 76 and the support plate 98, the support plate being of channeled cross section.

At its upper end, slot 102 merges into a large circular opening 108, and the locking projection 104 is partially cut away as at 110 to facilitate its insertion through opening 108 when the slide is to be mounted upon and between plate 76 and the support plate 98.

A pin 112 extends into slot 94 from a circular plate carried by the inner end of the cylinder 114 of the lock assembly 24, said cylinder rotating in a barrel 116. Barrel 116 has flat, diametrically opposed surfaces 118, engaged by diametrically opposite straight portions of an opening formed in a lock washer 120 circumposed about the barrel. A locking tip 122 on washer 120 extends into a recess provided in an opening 124 formed in the outer hood wall 12. An opening 126 formed in the hood emblem 16 registers with opening 124, the barrel extending through the registered openings. A spacer sleeve 128 is circumposed about the barrel, to permit access to the key slot of the lock cylinder, a key 130 being extendible into said slot for rotating the cylinder, thereby to shift pin 112 through a circular path between the full and dotted line positions thereof shown in Fig. 6. A lock nut 132 is threaded upon the barrel, against the back surface of the outer hood wall, to hold the lock assembly 24 in place.

In operation, and assuming that the hood is closed and latched as in Fig. 6, one rotates the lock cylinder to shift the same to the full line position of Fig. 6. This shifts the slide of the lock device, which slide has been shown per se in Fig. 8, downwardly to the full line position of Fig. 6. This causes the locking projection 104 to be disposed in the path of swinging movement of the bight part of yoke 60. Locking projection 104 prevents swinging movement of the yoke from the full line position thereof shown in Fig. 6, and as a result, the tongue 64 remains engaged under latch element 42, even if an unauthorized person attempts to swing the handle 52 to the dotted line position thereof shown in Fig. 6.

If it is desired to unlock the hood, one inserts the key in the lock cylinder, and rotates the cylinder to cause pin 112 to move to 180° to the dotted line position of Fig. 6. This shifts the slide upwardly, disposing the projection 104 clear of the bight part of yoke 60. The hood can now be opened in the regular manner.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a hood latch locking device the combination, with an automotive vehicle hood latch including a swingable latching yoke carried by a hood and a yoke-engaging latch element carried by the stationary member of the vehicle, of a lock cylinder rotatably mounted on the hood, a plate mounted on the hood inwardly from said cylinder, means movably mounted on the plate to shift between a first position in the path of swinging movement of the yoke and a second position clear of said yoke, and a pin carried by the lock cylinder for shifting said first means between said positions thereof, responsive to rotation of the cylinder by a user, said first-named means comprising a slide including a flat body slidably mounted upon said plate, said slide further including a bifurcated head at one end projecting in the direction of the lock cylinder, and including at its other end a locking projection extending in an opposite direction from the head, the bifurcations of said head being engageable by the said pin to shift the slide upwardly and downwardly responsive to rotation of the cylinder.

2. In a hood latch locking device the combination, with an automotive vehicle hood latch including a swingable latching yoke carried by a hood and a yoke-engaging latch element carried by the stationary member of the vehicle, of a lock cylinder rotatably mounted on the hood, a plate mounted on the hood inwardly from said cylinder, means movably mounted on the plate to shift between a first position in the path of swinging movement of the yoke and a second position clear of said yoke, and means carried by the lock cylinder for shifting said first means between said positions thereof, responsive to rotation of the cylinder by a user, said first-named mean comprising a slide including a flat body slidably mounted upon said plate, said slide further including a head at one end projecting in the direction of the lock cylinder, and including at its other end a locking projection extending in an opposite direction from the head, the head being engageable by the second-named means to shift the slide upwardly and downwardly responsive to rotation of the cylinder, said locking device further including a support plate fixedly secured to the first-named plate, the body of the slide being engaged between the first-named plate and said support plate, said support plate and slide having coacting parts guiding the movements of the slide.

3. In a hood latch locking device the combination, with an automotive vehicle hood latch including a swingable latching yoke carried by a hood and a yoke-engaging latch element carried by the stationary member of the vehicle, of a lock cylinder rotatably mounted on the hood, a plate mounted on the hood inwardly from said cylinder, means movably mounted on the plate to shift between a first position in the path of swinging movement of the yoke and a second position clear of said yoke, and means carried by the lock cylinder for shifting said first means between said positions thereof, responsive to rotation of the cylinder by a user, said first-named means comprising a slide including a flat body slidably mounted upon said plate, said slide further including a head at one end projecting in the direction of the lock cylinder, and including at its other end a locking projection extending in an opposite direction from the head, the head being engageable by the second-named means to shift the slide upwardly and downwardly responsive to rotation of the cylinder, said locking device further including a support plate fixedly secured to the first-named plate, the body of the slide being engaged between the first-named plate and said support plate, said support plate having a longitudinal slot, said slide having guide grooves at its opposite sides defining a tongue extending within the slot of the support plate.

References Cited in the file of this patent

UNITED STATES PATENTS

| | | |
|---|---|---|
| 2,234,872 | Marple | Mar. 11, 1941 |
| 2,677,262 | Vigmostad | May 4, 1954 |